Patented Sept. 28, 1948

2,450,318

UNITED STATES PATENT OFFICE 2,450,318

METHOD FOR PRODUCING POULTRY FEEDS

Richard E. Wagamon, Harbeson, Del.

No Drawing. Application March 23, 1948, Serial No. 16,615

3 Claims. (Cl. 99—4)

This invention relates to poultry feed and, more particularly, a feed mix especially adapted for the industrial raising of chickens.

The object of this invention is to provide a chicken feed that will economically produce the maximum weight in chickens within the normal growing time. The production of a feed with high nutritional values has for long been an object, and, according to the present status of the art, the attainment of a 3 lb. average weight per chicken in 13 weeks is considered good. The additional factor of producing appetite in the chickens is the object of this invention.

It is now proposed to provide a feed having an odor sweetish and tantalizing to chickens, and having a relatively high alcoholic content whereby the chickens are first attracted to the feed and, after partaking of it, are stimulated and induced to eat maximum amounts.

In accordance with this invention, the preferred ingredients per 104 lb. bag are as follows:

| | Pounds |
|---|---|
| Corn meal | 78 |
| Dried milk | 3 |
| Dried whey | 3 |
| Baker's yeast | 2 |
| Water | 18 |

The corn meal, dried milk, and dried whey are mixed in bulk and stored in a bin. Shortly before delivery of the feed to the chicken feeder, the yeast is dissolved in the water and sprayed on the mix as it comes out the bin chute, and thereafter the moistened mix is bagged.

Soon after the mix is moistened, it starts to work and, some twelve to thirteen hours later, generates heat sufficient to be readily discernible by touch. Thereupon, the mix is ready for use, and is preferably fed between 13 and 72 hours after moistening and bagging, although samples fed up to 96 hours thereafter have proved satisfactory, with no deleterious effects from prolonged working detectable.

Analysis of a typical 104 lb. bag of the mix, run 96 hours after moistening and bagging, showed the following food factors:

| | Per cent |
|---|---|
| Protein | 7.6 |
| Fat | 3.0 |
| Fiber | 2.4 |
| Carbohydrate | 2.71 | and, by weight:

| | Milligrams |
|---|---|
| Thiamin | 0.58 |
| Riboflavin | 0.9 |
| Niacin | 4.5 | plus:
  Proteolytic enzymes
  Ferment sugars
  Liquid and inert ingredients

Chickens in flocks fed exclusively on the above mix have attained an average weight of from 3.5 lb. to 3.75 lb. in 13 weeks. Chickens suffering from infections such as bronchitis, from which the most immediate danger entails loss of appetite have returned to their normal eating habits within a matter of days after being started on the mix.

Of particular importance is the action of the live yeast bacteria which provide high food values not only as of the time of introduction into the mix, but which multiply to increase the food values while producing as a by-product, alcohol. The alcohol, of course, is thereby distributed quite uniformly throughout the entire mass of the mix so that no further mixing is required.

It is to be understood that the proportions of the ingredients may be changed, equivalent meal and milk solids may be substituted, and medicinal doses added without departing from the basic concept defined in the following claims.

I claim:

1. The process of producing a feed for poultry which comprises producing a dry bulk mix of grain meal and dry milk solids, moistening the mix with a solution of baker's yeast dissolved in liquid, promptly bagging the moistened mix, and storing the bagged wet mix for at least thirteen hours and up to ninety-six hours so that fermentation thereof produces relatively high alcoholic content.

2. The process of producing a feed for poultry which comprises the sequential steps of first mixing dry corn meal, dried milk, and dried whey in the proportions per 104 lb. mix of, substantially, corn meal 78 lb., dried milk 3 lb., dried whey 3 lb., subsequently moistening the mix, proportionally, with a solution substantially of 2 lb. baker's yeast dissolved in 18 lb. water promptly bagging the moistened mix before fermentation, and fermenting the moistened mix in the bag for between thirteen and seventy-two hours.

3. The process of producing a moist feed for poultry adapted to be fed within ninety-six hours after moistening which comprises the sequential steps of first mixing corn meal and dried milk solids in the proportions per 104 lb. mix of, substantially, corn meal 78 lb., dried milk solids 6 lb., subsequently moistening the mix proportionally with a solution substantially of 2 lb. baker's yeast dissolved in 18 lb. water, and promptly bagging the moistened mix in units for dispensing before appreciable fermentation of the moistened mix occurs, whereby fermentation of said moistened mix occurs in the bag.

RICHARD E. WAGAMON.

REFERENCES CITED

The following references are of record in the file of this patent:

UNITED STATES PATENTS

| Number | Name | Date |
|---|---|---|
| 1,615,024 | Maybee | Jan. 18, 1927 |
| 1,685,004 | Mislin | Sept. 18, 1928 |
| 1,898,350 | Dyer | Feb. 21, 1933 |
| 2,124,820 | Hellinger | July 26, 1938 |
| 2,313,275 | Schopineger | Mar. 9, 1943 |

FOREIGN PATENTS

| Number | Country | Date |
|---|---|---|
| 6,898 | Australia | 1927 |
| 477,863 | Great Britain | 1938 |